Feb. 12, 1929.

Re. 17,211

W. H. McKISSICK

SAFETY SHEAVE BLOCK

Original Filed May 3, 1926 3 Sheets-Sheet 1

Inventor
W. H. McKissick

By Jack A. Sehley

Attorney

Feb. 12, 1929.

Re. 17,211

W. H. McKISSICK

SAFETY SHEAVE BLOCK

Original Filed May 3, 1926 3 Sheets-Sheet 2

Inventor
W. H. McKissick

By Jack A. Schley

Attorney

Feb. 12, 1929. Re. 17,211

W. H. McKISSICK

SAFETY SHEAVE BLOCK

Original Filed May 3, 1926 3 Sheets-Sheet 3

Inventor

W. H. McKissick

By Jack A. Schley

Attorney

Reissued Feb. 12, 1929. Re. 17,211

UNITED STATES PATENT OFFICE.

WILLIAM H. McKISSICK, OF TULSA, OKLAHOMA.

SAFETY SHEAVE BLOCK.

Original No. 1,633,537, dated June 21, 1927, Serial No. 106,373, filed May 3, 1926, and in Great Britain June 25, 1927. Application for reissue filed October 29, 1928. Serial No. 315,899.

This invention relates to new and useful improvements in safety sheave blocks.

The invention pertains to the same type of block as is shown and described in my Patent 1,633,489, dated June 21, 1927, and involves certain specific improvements thereover.

The object of the invention is to provide a block having each side plate provided with guard flanges for retaining the cable and one of said plates arranged to be bodily shifted to one side to open or displace the guard flanges for the removal or insertion of a cable.

Another object of the invention is to provide a movable guard plate which may be shifted laterally to either side, together with means for retaining its flanges out of alinement with the flanges of the other plate.

A further object of the invention is to provide a supporting structure with guard plates attached thereto to form a housing and retain the cable.

Another object of the invention is to provide a central dividing plate and spacer members for positioning supporting bars in a novel manner.

A construction designed to carry out the invention will be hereinafter described with other features of the invention.

Figure 1:
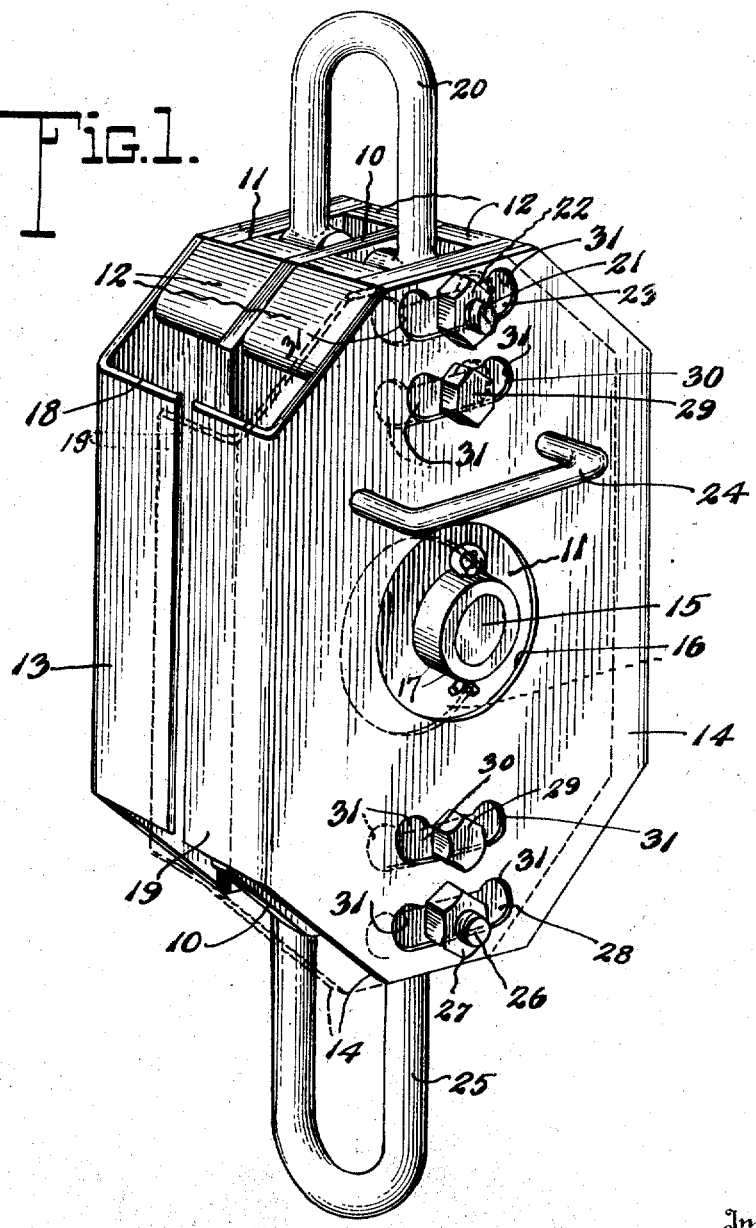
Figure 2:
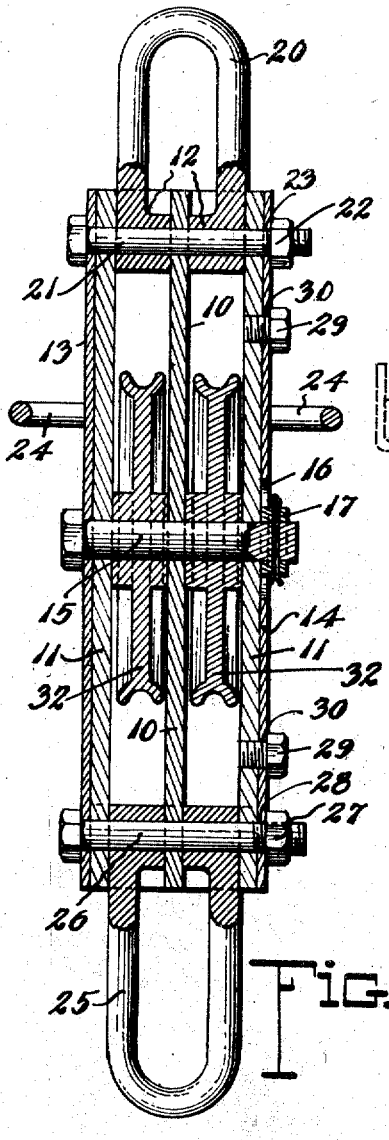
Figure 3:
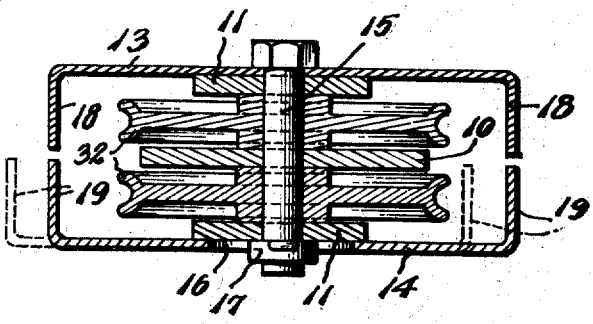
Figure 4:
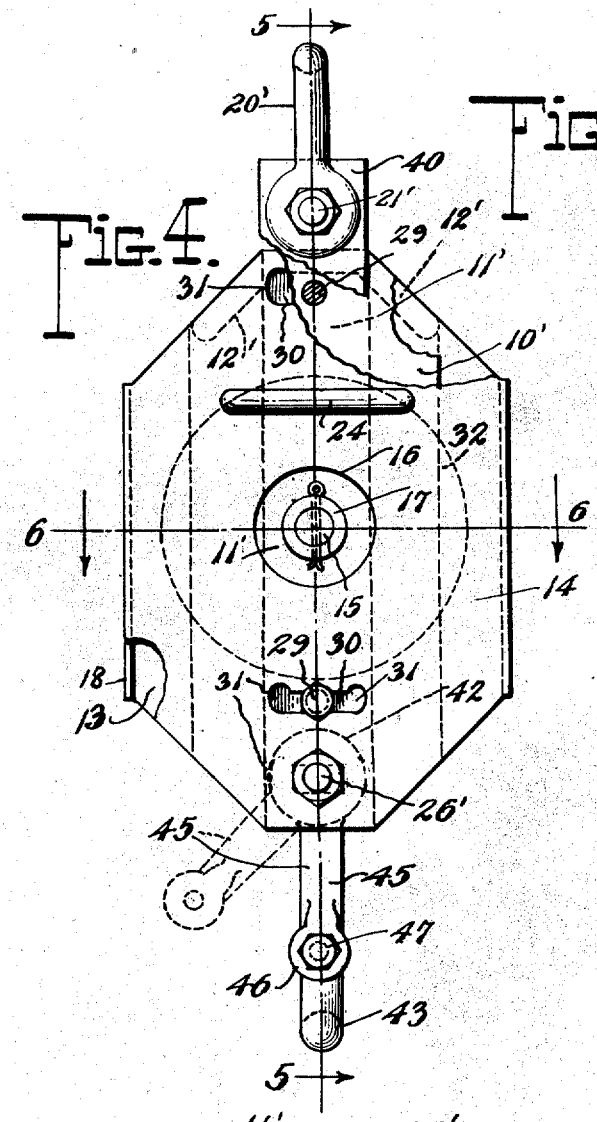
Figure 5:
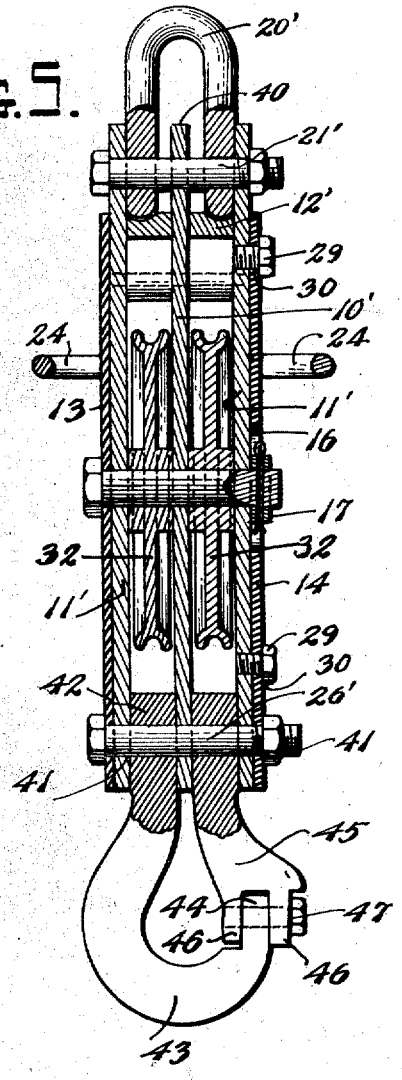
Figure 6:
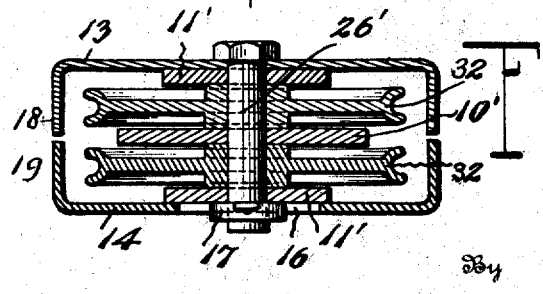

The invention will be more readily understood from a reading of the following specification and by reference to the accompanying drawings, in which an example of the invention is shown and wherein:

Figure 1 is a perspective view of a block constructed in accordance with my invention, Figure 2 is a vertical cross-sectional view, and Figure 3 is a central longitudinal sectional view, Figure 4 is an elevation of another form of the invention, Figure 5 is a vertical sectional view taken on the line 5—5 of Figure 4, and Figure 6 is a horizontal cross-sectional view taken on the line 6—6 of Figure 4.

In the drawings the numeral 10 designates a central vertical partition plate from which vertical side bars 11 are spaced by blocks or members 12 at the upper ends of the same. Guard plates 13 and 14 respectively are mounted vertically on the bars 11, the plate 13 being immovable and the plate 14 being adjustable transversely of the block. An axle 15 mounted in the partition and bars extends through the plates, the plate 14 having an enlarged opening 16 to permit it to shift relatively of the nut 17 which holds the axle in place.

The plates 13 and 14 extend transversely beyond the vertical sides of the partition and bars. The plate 13 has inwardly directed longitudinal flanges 18 along each vertical edge. The plate 14 has similar flanges 19 normally aligned with the flanges 18. The adjacent edges of the flanges may be spaced slightly apart as is shown in the drawings.

The upper ends of the bars 11 extend between the blocks 12. The upper becket or bail 20 straddles the partition plate 10 and its eyes are disposed between said plate and the upper ends of the bars. A becket bolt 21 passes through the parts 10, 11 and 13 and the eyes of the upper becket. The plate 14 has a horizontal slot 23 through which the bolt passes. A nut 22 screwed onto the bolt overlies the plate 14. The plates 13 and 14 each have a hand-hold 24. The lower becket 25 is pivoted on a bolt 26 passing through the same parts as the bolt 21. The plate 14 has a slot 28 receiving the bolt 26 and a nut 27 screwed on the end of the bolt 26.

For fastening the guard plate 14 in place, particularly if the becket bolts are removed, a pair of stud bolts 29 mounted on the adjacent side bar 11, engage in slots 30 arranged adjacent the slots 23 and 28. Each of the slots 23, 28 and 30 has a notch 31 at each end for receiving the bolts 21, 26 and 29, whereby the flanges 19 are retained out of register with flanges 18, when shifted either to the right or left. Sheaves 32 are mounted on the axle 15 on each side of the plate 10.

It will be seen that the plate 10 and the bars 11 are suspended directly from the becket 20 and bolt 21 and these parts carry the axle 15 and the lower becket 25 and its bolt 26. The vertical edge portions of the plate extend slightly beyond the blocks 12, thus dividing the cable channels formed on each side of said plate and enclosed by the guard plates and the flanges. The blocks at the upper end separate the lines of cable passing around the sheaves and add to the safety of the housing.

When it is desired to open the block to insert or remove the cable, the stud bolts 29 are loosened as are the nuts 22 and 27. The guard plate 14 is then free to be moved to one side as is shown in dotted lines in Figure 3. This displaces the flanges 19 from the flanges 18 sufficiently to provide ample openings between the edges of said flanges for the passage of the cable lines. The notches 31 of the plate 14 are thus seated on the bolts to retain the cable gap between the flanges. The stud bolts and nuts 22 and 27 may then be tightened when it is desired to lock the flanges out of register with each other, or in mis-matched relation as dotted in Figure 3, in which position the block can be used.

In order to remove the cable from the sheaves, the lower becket 25 must be removed. After this operation the plate is shifted until the flanges are registered. The plate is then secured in position by fastening the bolts and nuts. The operation of the block is very simple and the long guard flanges 18 and 19 protect the hands of the workman and prevent injury by contact with the lines of the cable. This is augmented by the blocks 12 at each end.

It is desirable to remove the lower becket bolt under some conditions and the construction of the block may be simplified as is shown in Figures 4 to 6. In this form the central partition plate 10′ has an upwardly extending lug 40 and the bars 11′ are elongated to equal the length of the plate. Spacer yokes 12′ are secured to the shoulders of the plate 10′ and extend laterally of the ends of the bars 11′ adjacent their upper ends. The upper becket bolt 21′ passes through the upper ends of the side bars and the lug 40 and the upper becket 20′ is hinged thereon. The guard plate 14 in these figures has the slots 30 and stud bolts 29, as before described, but the slots 23 and 28 are omitted. The bottom becket bolt 26′ passes through apertures 41 in the guard plates. The bottom becket has enlarged ears 42 engaging between the plates 13 and 14 on each side of the plate 10′ and hinged on the bolt 26′.

The becket is of particular construction, one member 43 forming a hook having an ear 44 on the end of its bill. The other member 45 forms a keeper and has spaced ears 46 at its lower end receiving the ear 44 therebetween. A machine bolt 47 engaging in the ears fastens the parts together. It will be seen that by removing the bolt 47 the keeper member 45 may be swung to one side and a line easily looped over the hook member 43. When it is desired to shift the plate 14 the lower becket and its bolt 26′ are removed and the stud bolts 29 are loosened.

Various changes in the size and shape of the different parts, as well as modifications and alterations, may be made within the scope of the appended claims.

What I claim, is:

1. In a safety block, a support, a sheave journaled on the support, a pair of guard plates attached to the support and having upright guards flanges at each side normally in registration, means whereby one of said plates is immovably attached to the support, and means whereby the other plate is rendered laterally adjustable and non-rotatable.

2. In a safety block, a support, a becket from which the support is suspended, a sheave journaled on the support, a pair of guard plates attached to the support and having upright guard flanges at each side normally in registration, means whereby one of said plates is immovably attached to the support, means whereby the other plate is rendered laterally adjustable and non-rotatable, and spacer members mounted on the support between the plates and above the sheave.

3. In a safety block, a support, a becket from which the support is suspended, a sheave journaled on the support, a pair of guard plates attached to the support and having upright guard flanges at each side normally in registration, one of said plates being provided with slots and fastening devices passing through the slots of said plate and engaging the support, whereby said plate is adjustably mounted, the other plate being immovably secured to the support.

4. In a safety block, a support, a becket from which the support is suspended, a sheave journaled on the support, a pair of guard plates attached to the support and having upright guard flanges at each side normally in registration, one of said plates being provided with slots, and spacer members mounted on the support between the plates and above the sheave.

5. In a safety block, a support, a becket suspending the support, a pair of guard plates, each having inturned guard flanges, a sheave mounted on the support relatively between the flanges of each plate, means whereby one of said plates is immovably attached to the support, means whereby the other plate is render non-rotatable and adjustable laterally of the support, whereby its flanges are displaced laterally from the flanges of the other plate to open the block, and means for securing the adjustable plate in its closed position.

6. In a safety block, a support, a becket suspending the support, a pair of guard plates, each having inturned guard flanges, a sheave mounted on the support relatively between the flanges of each plate, means whereby one of said plates is immovably attached to the support, means whereby the other plate is rendered non-rotatable and adjustable laterally of the support, whereby its flanges are displaced laterally from the flanges of the other plate to open the block and spacer members mounted on the support between the plates and above the sheave.

7. In a safety block, a central partition plate, upper and lower beckets connected with said plate, upright side bars spaced from said plate, an axle passing through said plate, sheaves journaled on said axle on each side of said plate, a pair of flanged guard members enclosing said bars, plate and sheaves, and means whereby one of said members is rendered adjustable laterally of the other to open the flanged portions thereof.

8. In a safety block, a central partition plate, upper and lower beckets connected with said plate, upright side bars spaced from said plate, an axle passing through said plate, sheaves journaled on said axle on each side of said plate, a pair of guard plates having registering side flanges, one of said guard plates being fastened to one of the side bars, the other guard plate having slots, and stud bolts passing through the slots of said guard plate and engaging in the adjacent side bar.

9. In a safety block, a central partition plate, upper and lower beckets connected with said plate, upright side bars spaced from said plate, an axle passing through said plate, sheaves journaled on said axle on each side of said plate, a pair of guard plates having registering side flanges, one of said guard plates being fastened to one of the side bars, the other guard plate having slots, and spacer members carried at the upper end of the central plate and spacing the side bars therefrom.

10. In a safety sheave block, opposite side bars, a sheave journaled therein, side plates secured to said bars and extending a substantial distance beyond the periphery of the sheave, elongated guard flanges directed inwardly from the side edges of the opposite side plates and extending longitudinally of the side bars above and below the axis of the sheave with their free edges registered with each other, both of said plates being nonrotatable and means for securing such edges in registered relation.

11. In a safety sheave block, opposite side bars, a sheave journaled therein, side plates secured to said bars and extending a substantial distance beyond the periphery of the sheave, elongated guard flanges directed inwardly from the side bars above and below the axis of the sheave with their free edges out of register with each other, and means for securing such edges in non-registering relation.

12. In a safety sheave block, a support, a sheave journaled on the support, a pair of guard plates attached to the support and having upright guard flanges at each side normally in registration, one of said plates being immovably attached to the support, and means for securing the other plate with its flange out of register with the flange of the immovable plate.

13. In a safety sheave block, an elongated support including a plurality of spacing bars, a pair of non-rotatable side plates secured to the bars of the support and spaced apart, a sheave journaled between the bars of the support, said sheave being covered on each plane side by said plates which extend a substantial distance beyond the periphery of the sheave, guards mounted between the plates and overhanging the sheave on each side of the support, and elongated guard flanges directed inwardly from the side edges of said plates transversely of the face of the sheave, there being two guards on each plate running longitudinally of the bars of the support above and below the journal of the sheave.

14. In a safety sheave block, a support, a sheave journalled therein, side plates mounted upon said support and having opposite elongated guard flanges directed inwardly from the plates above and below the axis of the sheave, and means for retaining said flanges out of register, whereby cable gaps are formed between correlated flanges.

15. In a safety sheave block, a support, a sheave journalled therein, side plates mounted upon said support and having opposite elongated guard flanges directed inwardly from the plates above and below the axis of the sheave, means for securing one of said plates in position, and means upon said plate cooperating with the securing means to secure the flanges of opposite plates in mismatched relation.

16. In a safety sheave block, a support, a sheave journalled therein, opposite side plates mounted upon said support and one thereof being formed with an elongated slot having seats at its opposite ends, inwardly extending guard flanges at each side of said plates, and securing means extending through said slot and adapted to engage either of said seats.

17. In a safety sheave block, a support, a sheave journalled in said support, non-rotatable side plates applied to said support and constituting part of a housing, guard flanges at opposite sides of the plates and coacting therewith to form a sheave housing and so related as to provide upright cable gaps at each side of the sheave, and means for fastening said plates upon the support, the cable gaps of the housing extending above and below the axis of the sheave and being coextensive with the guard flanges.

In testimony whereof I affix my signature.

WILLIAM H. McKISSICK.